US007012420B2

(12) United States Patent
Rodi

(10) Patent No.: US 7,012,420 B2
(45) Date of Patent: Mar. 14, 2006

(54) MEASURING DEVICE TO RECORD VALUES, IN PARTICULAR ANGLES OR LINEAR SEGMENTS

(76) Inventor: Anton Rodi, Paul-Ehrlich-Strasse 1, D-69181 Leimen (DE)

(*) Notice: Subject to any disclaimer, the term of this patent is extended or adjusted under 35 U.S.C. 154(b) by 23 days.

(21) Appl. No.: 10/752,627

(22) Filed: Jan. 7, 2004

(65) Prior Publication Data

US 2004/0140793 A1 Jul. 22, 2004

(30) Foreign Application Priority Data

Jan. 9, 2003 (DE) ................................ 103 01 848

(51) Int. Cl.
*G01R 25/00* (2006.01)
*G01R 33/025* (2006.01)

(52) U.S. Cl. .............................. 324/76.77; 324/207.12

(58) Field of Classification Search ............ 324/76.77, 324/76.11, 89, 76.47, 76.82, 207.12, 207.22, 324/207.23, 207.25, 623; 702/72, 94, 150, 702/151, 124, 163
See application file for complete search history.

(56) References Cited

U.S. PATENT DOCUMENTS

| | | | | |
|---|---|---|---|---|
| 3,019,390 | A * | 1/1962 | MacMillan | 324/76.78 |
| 4,451,782 | A * | 5/1984 | Ashida | 324/76.26 |
| 5,019,786 | A * | 5/1991 | Fairley et al. | 324/76.77 |
| 5,216,626 | A | 6/1993 | Kranitzky | |
| 5,329,359 | A * | 7/1994 | Tachikawa | 356/398 |
| 5,343,404 | A * | 8/1994 | Girgis | 702/72 |
| 5,361,312 | A * | 11/1994 | Kuchel | 382/293 |
| 5,408,192 | A * | 4/1995 | Bailey | 327/254 |
| 5,414,516 | A | 5/1995 | Morishita et al. | |
| 5,485,407 | A | 1/1996 | Ishimoto et al. | |
| 5,644,514 | A | 7/1997 | Abo et al. | |
| 5,793,243 | A * | 8/1998 | Farrow | 327/345 |
| 5,943,639 | A | 8/1999 | Tanaka et al. | |
| 6,018,318 | A | 1/2000 | Schödlbauer | |
| 6,087,829 | A | 7/2000 | Jäger | |
| 6,466,889 | B1 | 10/2002 | Schödlbauer | |
| 6,512,589 | B1 | 1/2003 | Rodi | |
| 2002/0144423 | A1 | 10/2002 | Rodi | |
| 2002/0171418 | A1 | 11/2002 | Hinz et al. | |
| 2003/0107510 | A1 | 6/2003 | Gartner et al. | |

FOREIGN PATENT DOCUMENTS

| | | | |
|---|---|---|---|
| DE | 39 32 187 | A1 | 1/1991 |
| DE | 44 19 050 | A1 | 12/1994 |
| DE | 196 05 472 | C2 | 8/1996 |
| DE | 197 19 564 | A1 | 11/1998 |
| DE | 197 47 753 | C1 | 5/1999 |
| DE | 198 49 554 | C1 | 3/2000 |
| DE | 101 13 871 | A1 | 9/2002 |
| DE | 101 17 193 | A1 | 10/2002 |
| DE | 101 60 835 | A1 | 6/2003 |
| EP | 0 394 942 | A2 | 10/1990 |
| EP | 1 102 040 | A1 | 5/2001 |

* cited by examiner

*Primary Examiner*—Vincent Q. Nguyen
*Assistant Examiner*—Hoai-An D. Nguyen
(74) *Attorney, Agent, or Firm*—Laurence A. Greenberg; Werner H. Stemer; Ralph E. Locher

(57) ABSTRACT

A measuring device for the recording of values, in particular angles or linear values, includes a measured value processor and a sensor arrangement, which supplies two phase-shifted signals. Connected in series to the sensor arrangement is an adjustment unit, which adjusts the amplitudes of the phase-shifted signals to one another and/or produces from them signals out of phase by about 90°, which are then evaluated.

15 Claims, 7 Drawing Sheets

MEASURING DEVICE TO RECORD VALUES, IN PARTICULAR ANGLES OR LINEAR SEGMENTS

BACKGROUND OF THE INVENTION

FIELD OF THE INVENTION

The present invention relates to a measuring device to record values, in particular angles and linear segments.

For most angle and linear measuring systems on the market sensors are used which supply signal sequences corresponding more or less to sinusoidal oscillation in combination with a suitable scale. In order to record rotational or linear directions, sensor arrangements must already contain 2 sensors which are arranged in such a way that they produce a sin/cos signal sequence in association with the attached scale. In addition, by displacing the angle or path of the sensors' signal sequence during a period, i.e. an incremental division of the attached scale, these segments can be recorded more finely leading to higher resolution. This is made use of both in incremental as well as absolute angle and linear measuring systems where suitable AD converters or so-called interpolators are employed. Patent specification DE 19505176 A1 describes optically produced sin/cos signals for a new type of absolute measuring system whilst patent specification CH 210599 corresponding to European Patent Application EP 11 02 040 A1 expands on this by giving further details on signal evaluation in such sensor systems.

The sin/cos signal sequence principle may be applied quite independently of the operating principles of the sensor employed such as optical, inductive, capacitive and magnetic.

The specific conditions for so-called magnetic angle and linear encoders are treated in particular detail below, in order to illustrate the basic requirements of sensor signal processing for high resolution and precise angle and linear recording systems in industrial use.

Today's incremental and especially high resolution absolute encoders in the so-called "mounted encoders" for angle and linear measuring systems are generally fitted in enclosed and sealed form with integral bearing. This contains the scale and sensor with signal processing and recently also the AD converter or interpolator as well as measured value processor and data transfer in an encoder housing. These encoders can certainly be accurately fitted and tested by the encoder manufacturer but are large and bulky in shape. Using a rotor or stator coupling they may be simply attached to the moving part being measured where there is enough room. The costly construction and expensive integral bearing do not allow a suitably wide standard application window for the many moving parts in machines and instruments. But increasing automation demands a cost-effective and small fitting of angle and linear encoders to any adjustment device, in order to record and control positions accurately and repeatedly via the superior control unit. For this reason, new developments using so-called "integrated encoders" have recently been considered which can be fitted without an expensive integral bearing and house the scale of the sensor separately, hence saving space. The use of microelectronics (ASIC) to integrate sensor functions as well as process the signal and measured values favors this trend. The small size of such angle and linear encoders fitted on one or several semiconductor chips as well as their economy of scale allow the desired standard fitting to machines, instruments as well as actuators (e.g. electric motors).

However, there are considerable hurdles to cross in the design of such systems for industrial use, as the external influences and tolerances under the local conditions where the encoders are to be installed are not sufficiently well known in today's world of divided labor of the sensor manufacturers. On the other hand, the machine and instrument manufacturer knows little about the requirements specific to sensors and is therefore also unable to take these into account sufficiently when designing his system. This means that each manufacturer of sensors, machines, instruments as well as the system component manufacturer applies his own standard operating and mounting conditions. Long life industrial goods which need to have exchangeable replacement parts pose a problem for subsequent standardization of interfaces from various manufacturers. On the binary data exchange side of the measured value output this is solved as far as possible using electronics with standardized ports. The interface between sensor and signal processing as well as sensor and separate scale still varies greatly depending on the manufacturer but also on the way they are incorporated as well as the environment. These individual requirements and arrangements do not allow the use of cost-effective designs with current solutions for smaller to medium numbers of units of a few tens of thousands per year, since specially designed parts are required either for the sensors, scales or signal processing in each case. This leads inevitably to increased resource in development, production and the stocking of replacement parts as well as small numbers of units at higher prices and longer scale-up times before they are mass-produced. Only when the number of units is larger than a few hundred thousand per year can specially made products be manufactured efficiently.

SUMMARY OF THE INVENTION

It is accordingly an object of the invention to provide a measuring device including a sensor arrangement to record values, which overcomes the above-mentioned disadvantages of the heretofore-known measuring devices.

Incorporating the invention at the interface between sensors and measured value processor by means of an adjustment unit having the features of the main claim as well as the sub-claims should allow the most efficient use of angle and linear measuring devices.

Conventional interface designs on magnetic angle/linear measuring systems compared to the improved design using the adjustment unit according to the invention are explained below.

Other features which are considered as characteristic for the invention are set forth in the appended claims.

Although the invention is illustrated and described herein as embodied in a measuring device to record values, in particular angles or linear segments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

For well-known absolute measuring systems it also shows the output of the binary coarse absolute value (50), which is created and processed by a separate sensor arrangement with the absolute encoded segment on the scale. The analog sin/cos values (40) thus created, together with the binary coarse absolute value (50), are supplied to the superior client control panel (5) for AD conversion via the signal and measured value processor (4).

Figure 2:
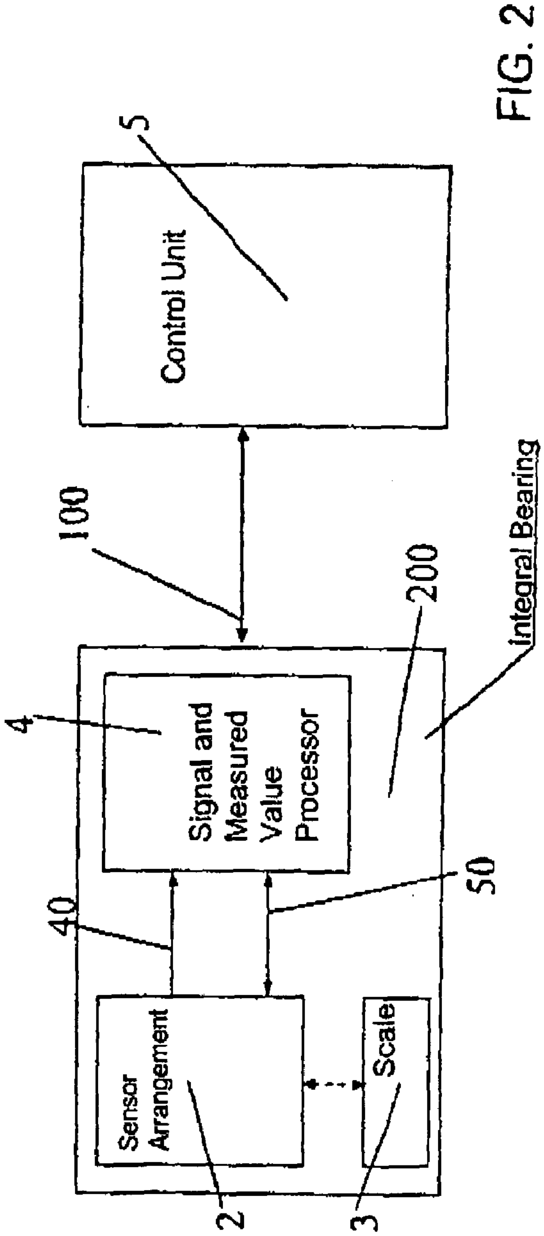

FIG. 2 shows the mounted encoder with integral bearing (200) with the sensor arrangement (2) for sin/cos signals (40) as well as coarse absolute values (50) located in the housing and the scale (3) together with the interpolator (AD conversion) with signal and measured value processor (4). In this design the absolute measured values are supplied to the control unit (5) via binary data transfer (100).

Figure 3:
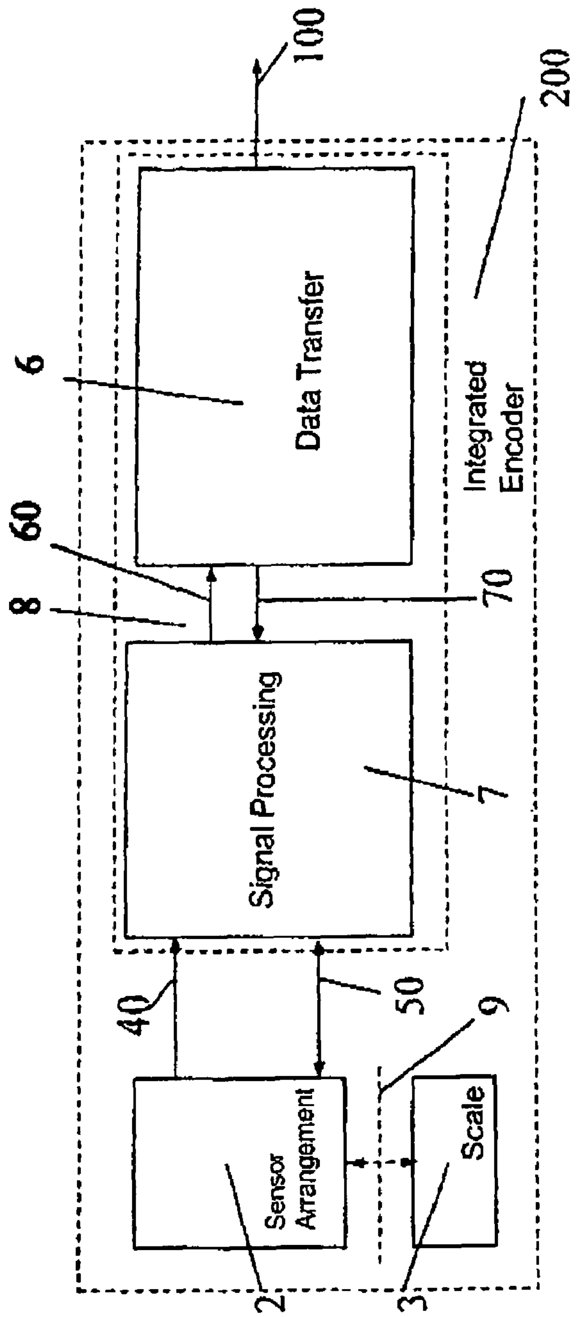

FIG. 3 shows an integrated encoder (200), having a sensor arrangement (2) for sin/cos signals (40) as well as coarse absolute values (50) and a separated (9) scale (3). In addition, in this design the binary data exchange (100) is supplied via an adjustment unit according to the invention with signal processing (7) as well as AD conversion together with measured value processor and data transfer (6). The adjustment unit with signal processing (7) and the AD conversion with measured value processor and data transfer (6) may be designed individually or as a combined electronic unit (8), e.g. in the particular ASIC.

Figure 4:
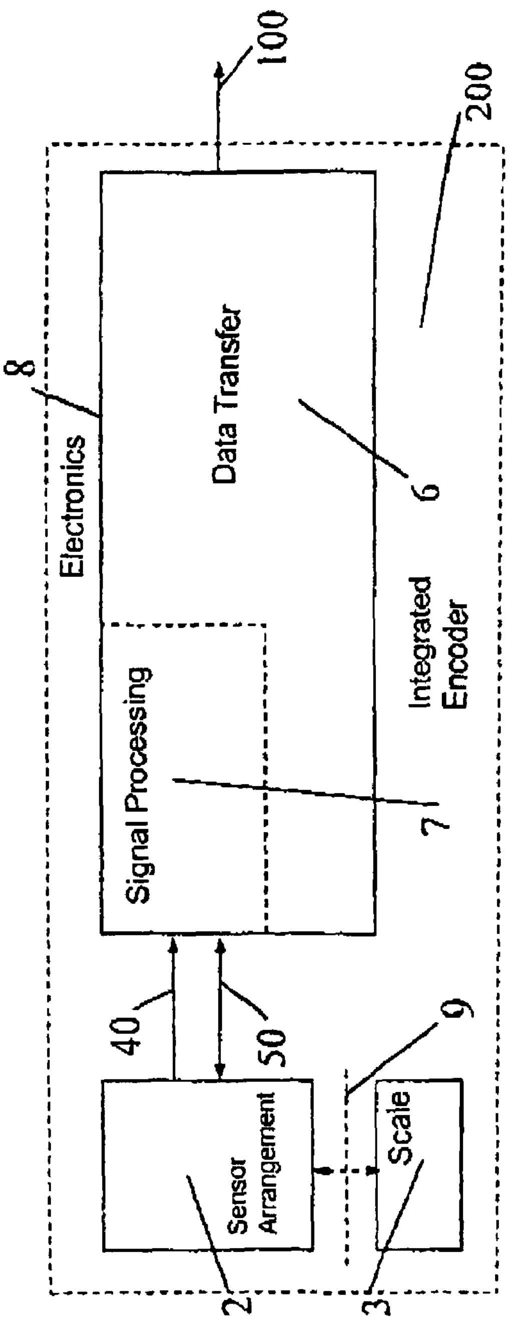

FIG. 4 shows an integrated encoder (200), having a sensor arrangement (2) for sin/cos signals (40) as well as total absolute values (50) and a separated scale (3). In addition, the binary data exchange (100) is supplied via the integrated adjustment unit according to the invention with signal processing (7) by the electronics (8) with AD converter, measured value processor and data transfer (6).

Figure 5:
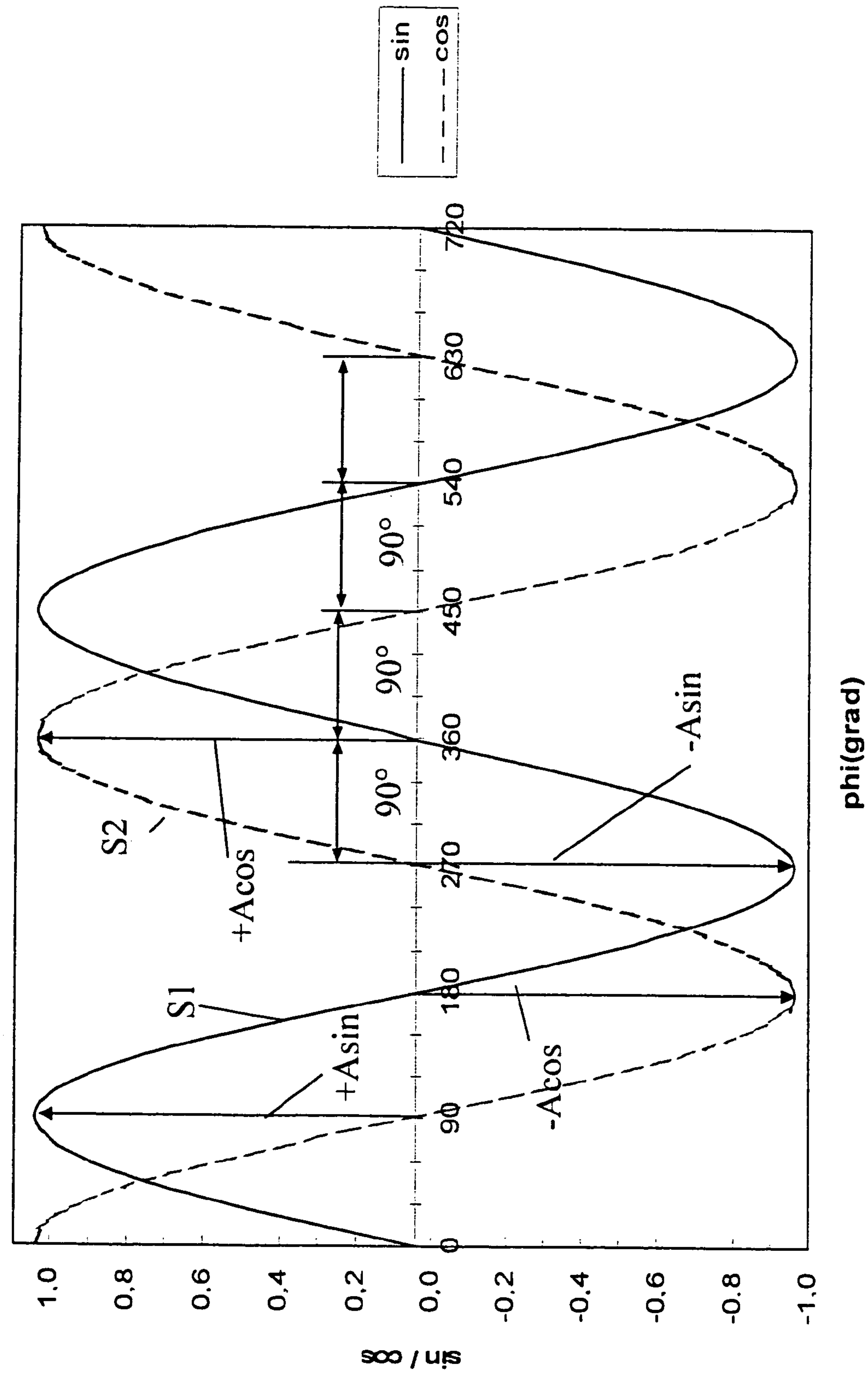

FIG. 5 shows sin/cos voltage waves, as received from e.g. sensors under ideal conditions. At the intersection of the particular sin/cos voltage with the base line, which is also called the reference, you get the amplitude ± Asin or ± Acos of the other voltage phase-shifted by 90° and the period of $2\pi=360°$ divided 4 times by $\pi/2$.

Figure 6:
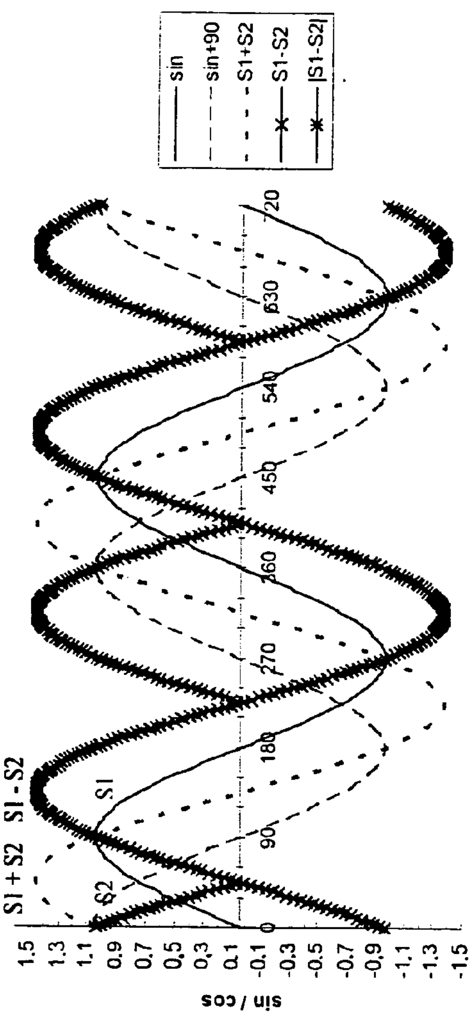

FIG. 6 shows the sin-voltage S1 and a second voltage S2 (cos-voltage) phase-shifted by +90° and having the same amplitude. The addition S1+S2 and subtraction S1–S2 of these voltages give voltages with $\sqrt{2}$ times amplitude which are also phase-shifted by 90° to one another and by 45° to S1 and S2.

Figure 7:
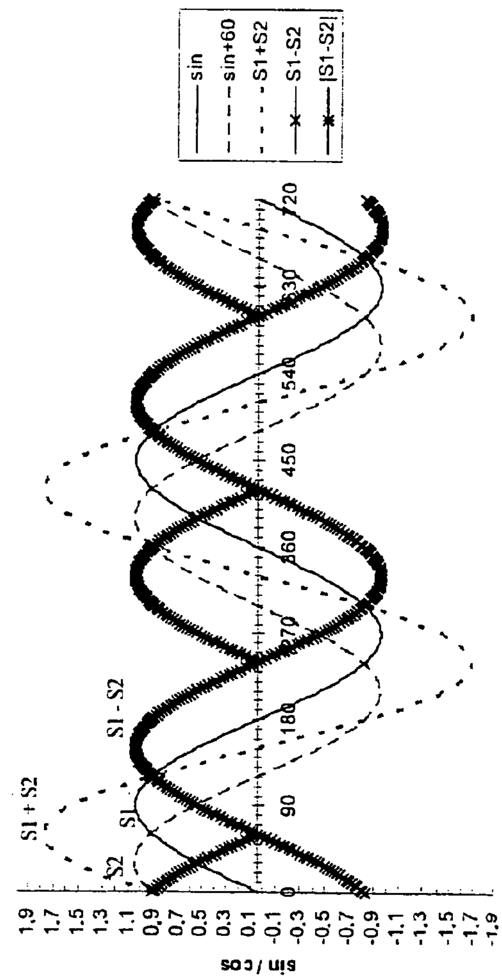

FIG. 7 shows sin-voltage S1 and a second voltage S2 phase-shifted by +60° and having the same amplitude. The addition S1+S2 and subtraction S1–S2 of these voltages give voltages phase-shifted by –75° to S1 and S2 in each case, one combined voltage having a $\sqrt{3}$ times amplitude and the other combined voltage the same amplitude as S1.

Figure 8:
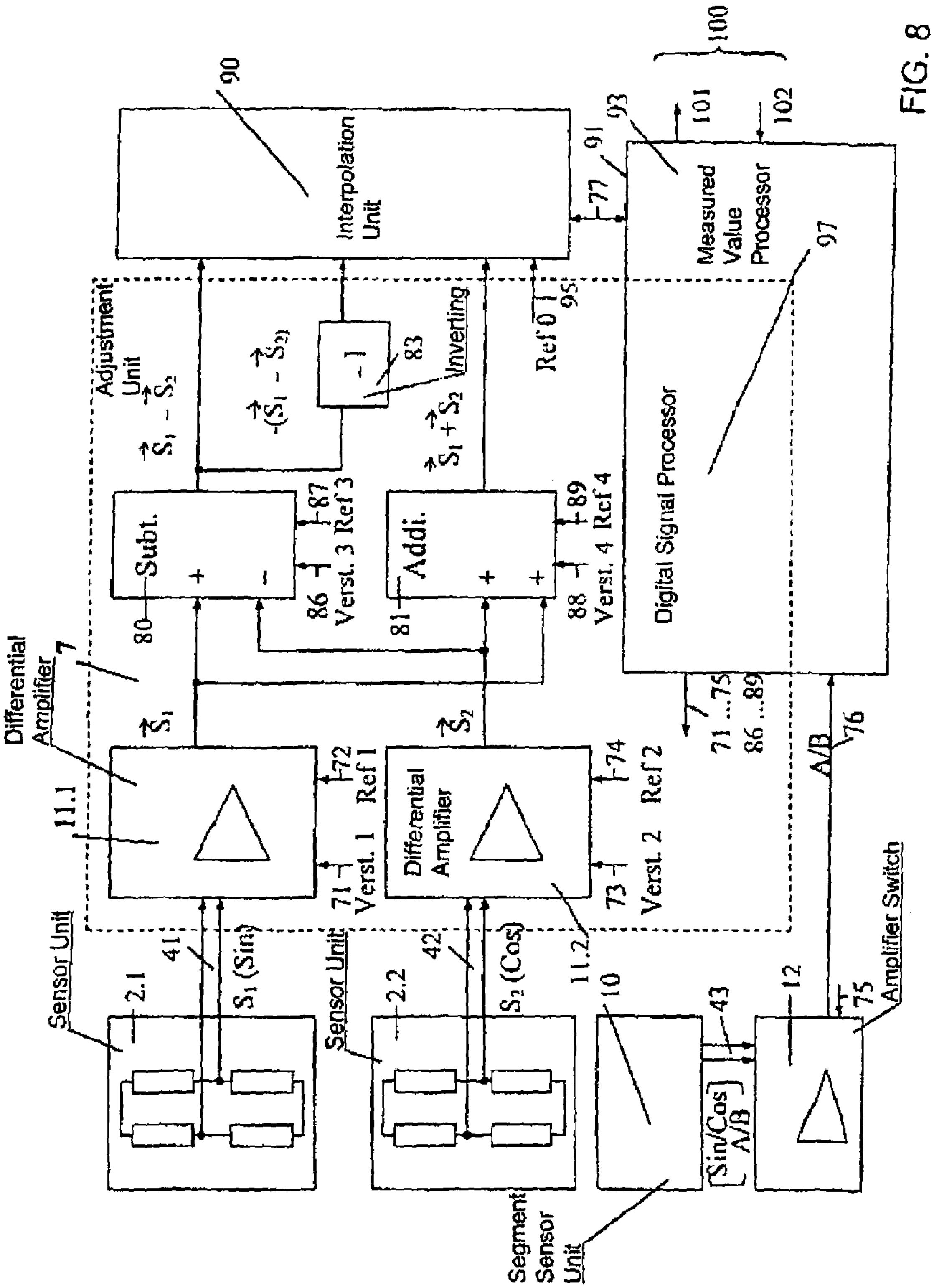

FIG. 8 shows an embodiment of the adjustment unit and measured value processor with data transfer as well as sensors according to the invention. This has an arrangement of two sensors (2.1, 2.2) such that they produce in combination with scales (not shown) two out of phase voltages S1 (41) and S2 (42), also described as sin and cos. A segment sensor unit (10) is also contained in the measuring system to transmit the particular segments (76) for numerical evaluation via corresponding signals (43). In the adjustment unit (7) the amplitudes and reference of the sensor voltages S1 and S2 are processed according to the invention and supplied to the interpolation unit (90) for direct evaluation. Using these data (77) and the segments (76) the total absolute value is processed in the measured value processor (93) with data transfer and supplied to the superior control unit via the binary data exchange (100).

Figure 9:
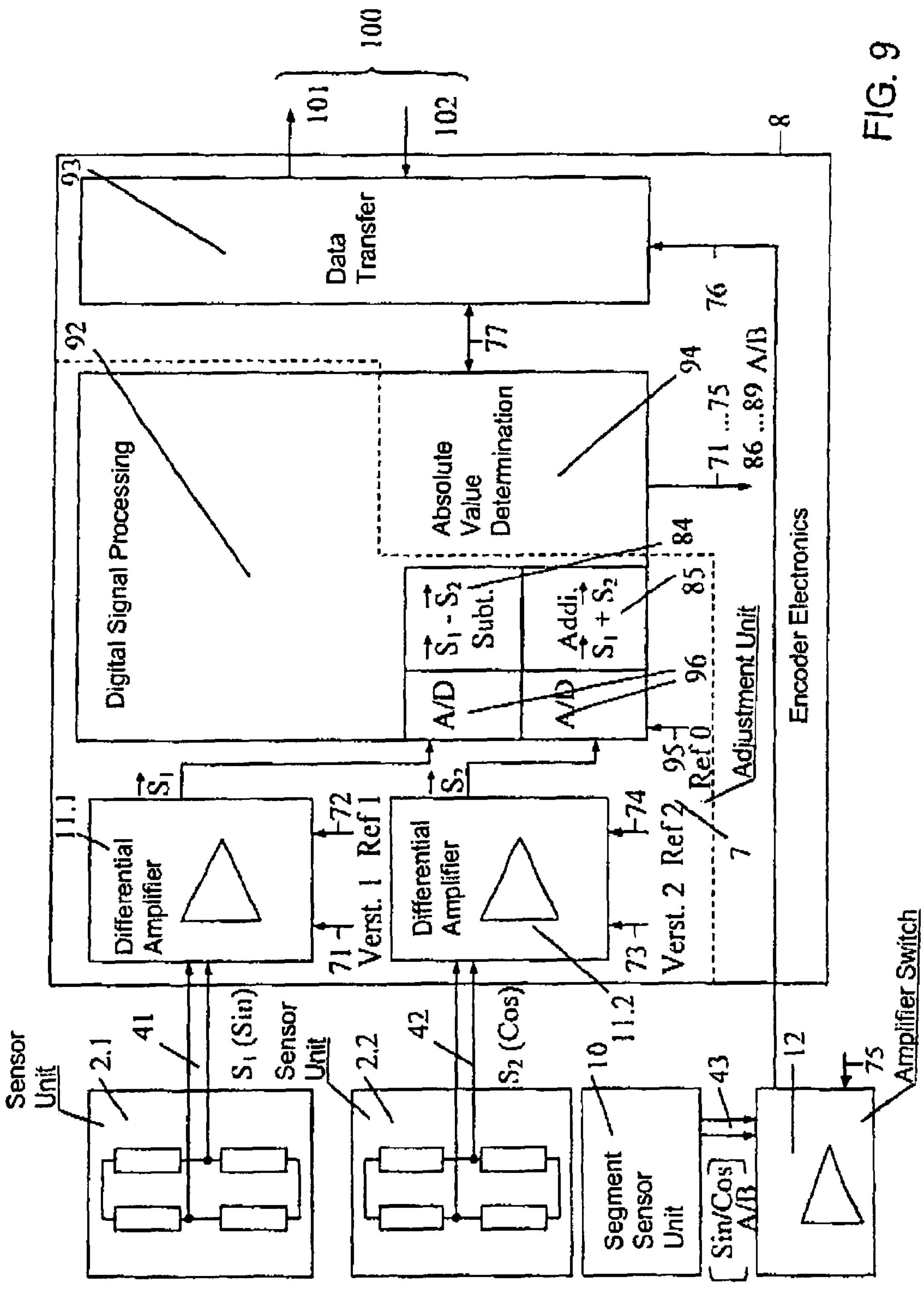

FIG. 9 shows another adjustment unit (7) according to the invention, which is integrated as far as possible into the electronics (8) and has a sensor arrangement as shown in FIG. 8.

Figure 10:
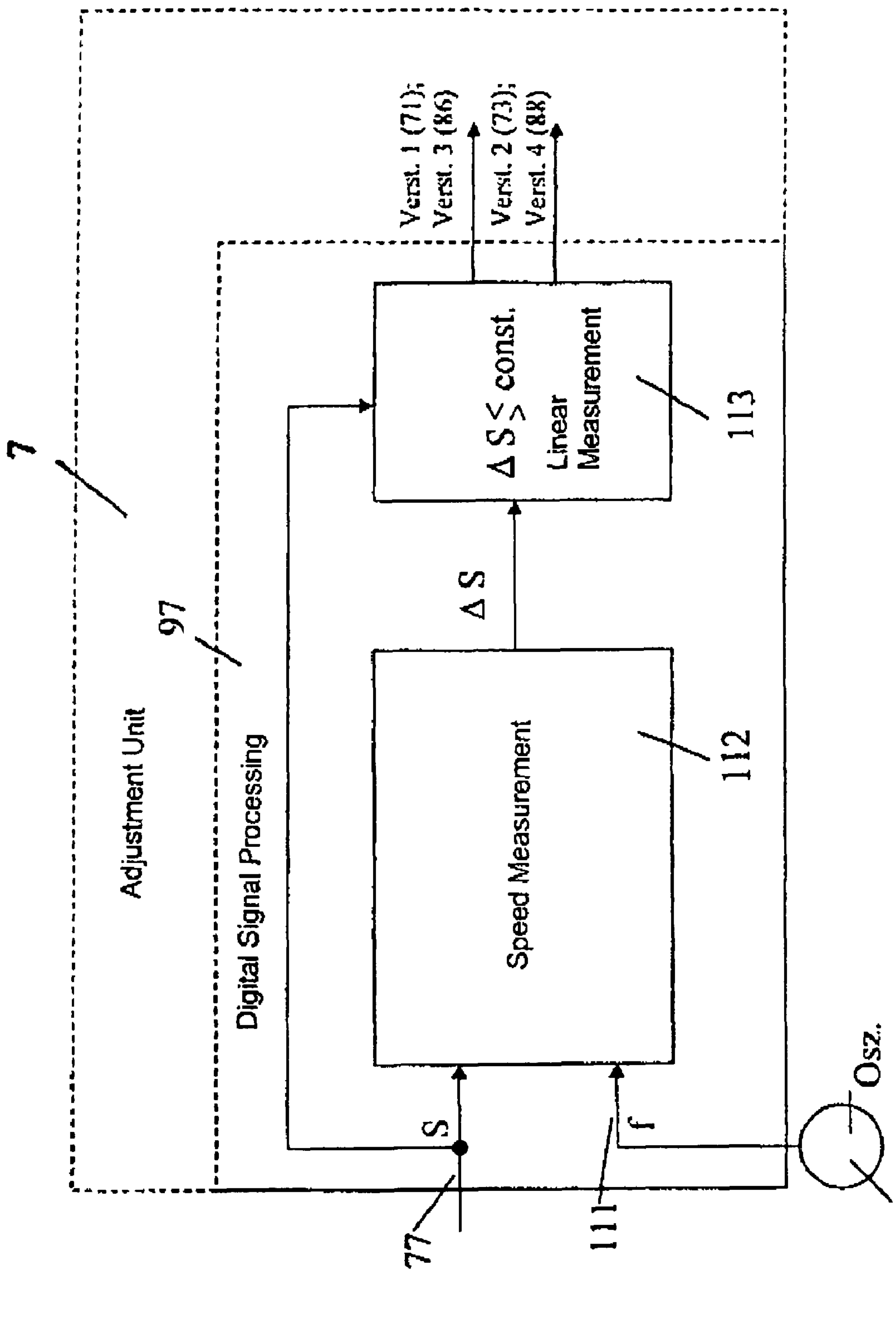

FIG. 10 shows the digital signal processing (97) for recording speed and linear measurement (112, 113) as a component of the adjustment unit (7).

DESCRIPTION OF THE PREFERRED EMBODIMENTS

Figure 1:
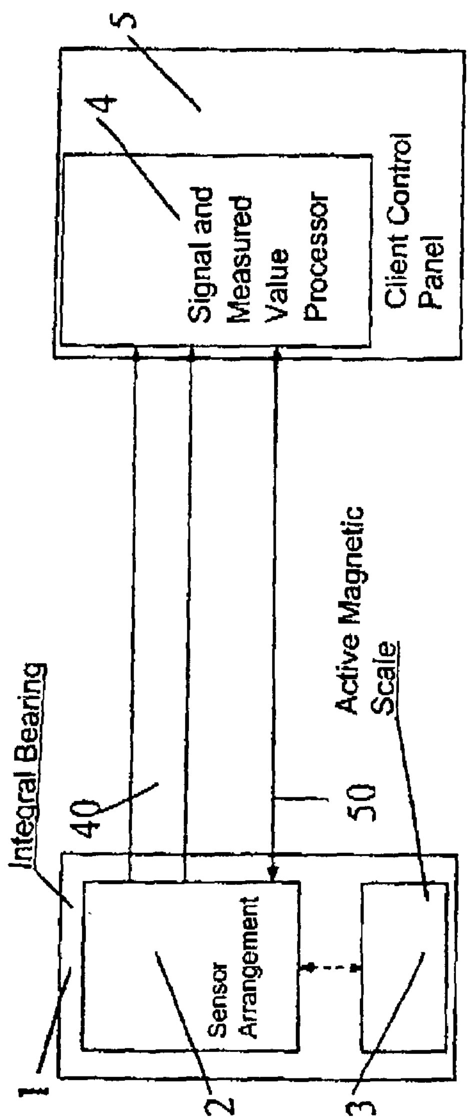
FIG. 1 shows a mounted encoder with integral bearing (1), having a sensor arrangement (2) for the output of sin/cos signals (40) in combination with the active magnetic scale (3) which is also located in the encoder housing.

The arrangement shown in FIG. 1 for a mounted encoder with integral bearing, both for incremental as well as absolute encoders for angle and linear measuring systems, is widespread in industrial drive technology for 13 to 18 bit resolution. In the costly servo control for electric motors the AD conversion as well as signal and measured value processing are mainly fitted on an interface card in the customer's control unit. Analog sin/cos signals are permanently transmitted from the encoder on the electric motor. To create the total absolute value a coarse basic absolute value of the incremental separation at standstill or low revolutions is transmitted in binary form. This basic absolute value is stored in the control unit and combined with the fine values gained from AD conversion of these sin/cos signals thus creating the total absolute value. Apart from the high costs of the complete arrangement and the problematic signal transfer in industrial environments which are prone to interference, the measuring system is too bulky and not ideally suited to direct operation of BUS transfer systems. This is the reason why the resolver solution is still very widespread in drive technology even if greater accuracy and the required resolution cannot be achieved this way.

The mounted encoder according to FIG. 2 already represents a more advanced and highly integrated measuring system solution. The complete signal processing takes place in the encoder and the total absolute value created is transmitted in binary form via an RS 485 or RS 422 serial port, which are also accessible to the usual bus systems. Such a measuring system is described in detail in patent specification CH210599 corresponding to European Patent Application 11 02 040 A1. The disadvantage as before is that the encoder with integral bearing is located together with the scale in a large housing. Such expensive and bulky encoder solutions are unsuitable for mass integration in machines and instruments. The desire is for integrated encoders without an integral bearing with the scale separated from the sensor and of the smallest possible size and most cost-effective design.

The bespoke solutions for a large number of manufacturers of sensors and encoders, actuators and control units have not made it possible to date to design versions of integrated encoders without integral bearing which meet all requirements. Magnetic encoders employ various sensor technologies each for particular requirements and environments that are based, for example, on magneto-resistive (MR, GMR) or Hall-based principles of measurement.

As a result, these encoders have different sensor signal outputs and various switches and are characterized to date by various signal correlation measures together with the accompanying electronics for AD conversion and measured signal processing. Added to this are the very costly and wide scales for absolute measuring systems which must be designed according to the measuring lengths used in industry and are a barrier to standardized application. Assistance in this respect is provided by DE 101 171 93.A1 according to which absolute scales may be manufactured on a production scale and cost-effectively. This represents an important step for modular absolute measuring systems. This invention also makes possible the construction of small magnetic encoders with resolutions of >13 . . . 16 Bit, which allows all of the encoder electronics together with the sensor to be produced on one chip.

However, problems which still remain to be solved for an integrated encoder besides having to adapt it to various sensor output signals are the tolerances and environmental conditions where it is being used. There is currently a lot of effort being put into magnetic measuring systems, both on the sensor as well as the scale side, to achieve the desired accuracy and resolution by using the tightest tolerances in production and fitting. Producing the required scale division accuracy over the total measuring length and in line with the sensor arrangement is alone a technical challenge in the production of an encoder system. Added to this is the problem of magnetizing active magnetic scales which besides uniform scale divisions also demand magnetic induction of at least the same shape for sinusoidal formation of sensor signals. Integration tolerances e.g. for longer linear encoders, also play a very important part as they put great demands on the construction and fitting of the scale and sensors with respect to height and axis symmetry.

The design of the adjustment unit according to the invention goes a very long way in helping to solve the above-mentioned problems. The measures described in the main claim allow a flexible approach to various sensor signals and can adapt to and compensate for the differences caused by the sensors themselves and particularly the interaction of the sensors with the scale under the conditions where they are going to be integrated and used. The adjustment unit according to the invention allows a broad application of various sensors and scales for high resolution and precise measurement of absolute angle and linear measuring segments. This creates a basis for the standardized use of small and cheap to build integrated encoders without integral bearing in a broad area of industrial applications.

As can be seen in FIG. 3, the adjustment unit with signal processing (7) is located according to the invention between the sensors (2)—with or without signal amplification—and the AD converter together with measured value processing as well as data transfer (6) for output of the total absolute value via binary data transfer (100). The adjustment unit processes the sinusoidal voltage waves coming from the very different types of sensor in such a way that, for example, values from the interpolator (A/D converter) can always be used consistently under real-time conditions to create the total absolute value. In particular, it enables interpolation (A/D conversion), which permits for example absolute fine resolution of 8 . . . 10 Bit of a segment—e.g. an N/S pole distance for magnetic systems with MR sensors—with the clock rate of the digital or computer logic of around 30 MHz to 50 MHz.

It is appropriate to integrate the adjustment unit with signal processing for example into a mixed signal ASICs together with the interpolator (AD converter), as shown in FIG. 4. This has the advantage of making optimal use of the numerous logic connections for adjustment, interpolation, and measured value processing purposes and saving space. In this way enormous production cost savings can also be made with an ASIC chip and further integration with the sensors prepared stepwise. The final construction allows the integrated encoder to be housed on one chip creating the right conditions for automation using integrated encoders on the large number of adjustment devices of machines and instruments.

The sin/cos voltage waves of magnetic sensors, for example, are shown in idealized form in FIG. 5. At the time when the two signal sequences of equal frequency and out of phase by 90° intersect the base or reference line, the particular amplitude of the sensor signals concerned is recorded. This happens for the signal sequences both above and below the reference line to give +Asin, +Acos, −Asin and −Acos. It is clear to see that the points of intersection with the reference line occur four times during a period of 360° (2 π), each having ideally the same interval of 90° (π/2). It is also obvious that the points of intersection with the reference line of one signal sequence are used to determine the maximum amplitude of the other signal sequence. In an ideal case two such sensor voltages will have the same amplitudes and intersections with the reference line of equal intervals—at least during the same period length. Real sensor signals never give these ideal waves, ignoring the greatest achievable equal period length of 360° (2 π). Instead, sensor signals have amplitudes which are not the same, non symmetrical waves against the reference line and also intersect with it at irregular intervals during a period length.

The embodiment of the adjustment unit according to the invention provides assistance by determining as far as possible idealized signal waves which can be used during subsequent signal evaluation to determine absolute angle or linear measurements.

Phase shift of the sensor signals of exactly 90° can also not be adequately maintained so that highly accurate recording of the absolute value of angle and linear measurements using familiar trigonometric sin/cos evaluation methods, e.g. by creating tan ϕ, is not guaranteed.

In order to guarantee this 90° or 270° phase shift, for example in magnetic sensors, the two sensors up to now had to be shifted by exactly 90° within the period of a division. Apart from the absolute accuracies of the division distances of magnetic scales, the production of such sensors in line with the widest range of dimensions is extremely problematic and cost intensive. Compared to maintaining the exact distance of the absolute division it is more accurate and simpler to make all divisions exactly the same. Relative error is much lower and much easier to control in production.

A further modification of the invention provides an elegant method of ensuring the most accurate phase shift of 90° of two signal waves. It also allows the shape of the waves (harmonic waves) to be ascertained which guarantees signal quality of the sensors for high precision measuring devices.

This solution may be derived simply from the trigonometric relationships of sinusoidal values:

The geometric addition and subtraction of any two signals of equal frequency and amplitude that are out of phase with one another produces two new sinusoidal signal sequences that are shifted by exactly 90° to one another.

Here we will not go into any more detailed derivation. The relationships derive from familiar basic equations, $$A_{+,-} = \sqrt{A_1^2 + A_2^2 \pm 2A_1 * A_2\cos(\varphi_2 - \varphi_1)}$$

$$A_+ \text{ or } A_- \tan\varphi_{+,-} = \frac{A_1 * \sin\varphi_1 \pm A_2 * \sin\varphi_2}{A_1 * \cos\varphi_1 \pm A_2 * \cos\varphi_2}$$

where A+, or A−are the amplitudes of vectors (S1+S2), or (S1−S2) and $\phi$ is the phase shift of both vectors.

FIG. 6 shows an example of the relationships. Compared to the original system with $\phi_1=0$ and $\phi_2=90°$, by the addition of S1+S2 and subtraction of S1−S2 the signal sequences in this example are out of phase by exactly 45° in each case and have their amplitude increased by $\sqrt{2}$ times. It is clear from the equations and this example that the deviation from 90° of the phase relationship between the signal sequences is compensated for and can therefore be applied to a precise evaluation of the measured values.

This method can be used for any signal sequence where $\vec{S_1}=A_1*\sin(x+\phi_1)$ and $\vec{S_2}=A_2*\sin(x+\phi_2)$ with A1=A2. FIG. 7 shows this again for a phase shift of 60° between the two signal waves. If necessary, however, the amplitudes A1 and A2 must first be adjusted.

Apart from solving the problem of achieving an exact phase shift of 90°, this method opens up completely new possibilities of using standardized measuring devices on a broad basis. The above-mentioned method of processing the signal in the adjustment unit ensures that the distances between the sensors are no longer bound by the divisions on the scales. This means that it is also possible to use the same sensor arrangement to carry out useful and accurate angle and linear measurement where the scale divisions are different from the sensor arrangement. This allows broad application of fixed sensor arrangements in large numbers in microelectronic designs (ASIC thick/thin film technology), without being constantly limited in number by being dependant on the scale divisions. This is extremely important for recording accurate absolute measured values even when there are small differences between the divisions of the scale and the sensor arrangement, as it can compensate for variations for example in scale length due to temperature effects or batch to batch variation during manufacture or fitting.

FIG. 8 shows a representation of how the signal processing takes place in the adjustment unit according to the invention. Familiar switch designs are intentionally dispensed with to give an overview of the relationships of the parts in the adjustment unit. All of the required switches, whether analog or digital, are described in the relevant specialist literature such as Tietze/Ch+ Schenk ISBN 0.3-540-42849-6 Springer Verlag Berlin.

The integrated adjustment unit with signal processing (7) already described briefly in FIGS. 3 and 4 is located between the sensors (2) and the interpolation unit (AD converter) (90) as well as before the measured value processor with total absolute value creation together with data transfer (91) to the binary output (101). Hence the adjustment unit with signal processing (7) in FIG. 8 comprises the differential amplifiers (11), the adder (81), the subtractor (80) and the necessary digital logic (97).

Each sensor unit (2.1) and (2.2) supplies signals, whose values have the form of a continuous function and are related to the segments of the assigned scale. The sensors are frequently arranged in bridge switches so that their signals move almost symmetrically around half of the supply voltage. We will not go into more detail about the scale and sensor as these are sufficiently well-known for angle and linear encoders which work according to all sorts of physical principles of measurement (e.g. optical, magnetic, inductive, capacitive etc.). The preference in what follows is again the field of magnetic angle and linear encoders. In principle, these designs may be applied just as well to other sensor technologies and are not limited to a single physical principle of operation for example. It is preferable for angle and linear encoders that the sensor system is designed such that the signal sequence corresponds to sinusoidal values. Therefore, in what follows we will continually refer back to these continuous elementary "trigonometric functions" although the adjustment unit described in the invention may also be used for other continuous elementary functions of the sensor signals. For example, the signal sequences which are out of phase may have a triangular or quadratic form with symmetrical intersections with the reference line and be evaluated accordingly via interpolators (A/D converters).

It is appropriate to arrange the sensor unit (2.1) and sensor unit (2.2) in a common sensor unit. Such sensor units on the market then supply the sin/cos signals. In FIG. 8, S1 (sin) (41) and S2 (cos) (42) are each supplied as a differential voltage to the assigned differential amplifiers (11.1, or 11.2). In each differential amplifier (11.1, or 11.2) or OPAMP, the sensor voltages are increased by a selectable amplification factor to the desired voltage amplitude and reference (72) or (74) at the amplifier input (71) or (73) for further processing. Sensor voltages without integrated amplifiers commonly increase in maximum amplitude to a few mV up to about 100 mV. However, high resolution interpolation requires at least 0.5 to 1 Vss and above, in order to achieve the desired resolution in the angular or linear segment. In addition, it is very important to have the maximum amplitudes of the sin/cos signals exactly the same for evaluation at least during a partial path so that it is appropriate to have a freely selectable amplification factor to equalize the differing sensor voltages just for this reason. The amplitudes of the sensor voltages amplified in this way to $\vec{S_1}$− and $\vec{S_2}$− usually move within half of the supply voltage of 5V and should, however, be exactly equal to each other. However, this also involves correspondingly fine adjustments of the reference via Ref 1 (72) and Ref 2 (74) to enable accurate evaluation. Moreover, these reference voltages which have been adjusted via Ref 1 and Ref 2 should be as close as possible to the common reference voltage Ref 0 (95) used for interpolation or AD conversion.

For ideal sensor signal waves which permanently remain unaffected by operating conditions such as temperature, sensor/scale distance and scale imperfections (divisions and magnetic field), the adjustments made on site when the machine was commissioned would be sufficient to carry out the evaluation of angle and linear measurements. Apart from the large number of parameters influenced to a great extent by faults in production, carrying out the integration and environmental conditions, it is unreasonable from the point of view of time and cost to adjust sensors on site, especially when replacing measuring devices on machines and instruments spread all over the world. It is therefore necessary to find a suitable method or switch design for achieving this, if accurate and high resolution angle and linear measuring systems are to be used on many machines and instruments which meet the demands of industry. This is achieved as far as possible with the adjustment unit (7) according to FIG. 8 of the invention in which determination of amplitude, the reference and speed enables the relevant adaptive adjustment processes to be undertaken according to requirements in all states of operation of the measuring device by means of digital signal processing (97) as well as control outputs 71, 72, 73, 74.

When switching on the measuring device with the assigned scale for the first time it is appropriate to check the sensor signals for suitable evaluation via the interpolator. This involves establishing the sum of the signal vectors of $\vec{S}_1$ and $\vec{S}_2$ in the adjustment unit (7), which must vary between $$|A|<|\vec{S}_1|+|\vec{S}_2|<1{,}414*|A|$$

, where $$|A|=|A_1|=|A_2|$$

$$|\vec{S}_1|=A_1*\sin(x+\phi_1)$$

$$|\vec{S}_2|=A_2*\sin(x+\phi_2) \text{ with } A_1=A_2=A.$$

If the sum of $|\vec{S}_1|+|\vec{S}_2|$ measured at standstill is not within 1 . . . 1.41 *|A|, amplification factors 1 (71), or 2 (73) must be set accordingly. This method of determining the signal will be sufficient for most applications and make the familiar more complex evaluation of the switch arrangement using ( $\vec{S}_1^{\,2}+(\vec{S}_2)^2=1$ redundant. In addition, small error differences in the measured signals already lead when squared to incorrect equalization adjustments.

Even as soon as the measuring devices are out of adjustment by for example one period length (scale division), the amplitudes are accurately adjusted in the adjustment unit according to the relationships described in FIG. 5 and the measured signals optimized for accurate interpolation (AD conversion). At the times during operation when the signal sequences intersect the common reference, the measured values may be permanently applied to determine the assigned amplitude or recorded to give average values for example and fed as a value directly to the differential amplifiers 11 by the digital signal processor (97) via control outputs 71 to 74.

The invention also allows other evaluations of the amplitudes recorded at the intersections with the common reference. For example, the average amplitude values calculated may be stored and supplied as a new amplification value individually or together etc to the particular differential amplifiers 11 (71 or 73) via the digital signal processor (97) only when there is an actual fluctuation. If there are differences in amplitude values +A and −A it is also possible to carry out adjustments in real-time and during permanent interpolation. Patent application 101 60 835. 7 shows that it is particularly advantageous to carry out adjustment at the interpolator at the time of intersection with the reference since the fluctuating amplitude value at this moment is not critical and will not lead to incorrect interpolation and hence incorrect evaluation.

The amplitudes of the sensor signals $\vec{S}_1$ and $\vec{S}_2$ adjusted in this way may be supplied directly to the interpolator (AD converter) (90) if the particular intersections with Ref 0 (95) also have the same symmetry (see FIG. 5). By having the same symmetry here we mean for example the particular signal half-period of 180°=π and the phase shift to one another of 90 °=π/2 which give four identical intersections of the signals with the common reference Ref 0 (95) of distance π/2 within a period length of 360°=2π.

If the half-periods of the particular signals equal π and are identical to a great extent but their phase shift is not exactly 90°=π/2 (see FIG. 7), the invention allows a subtraction $\vec{S}_1-\vec{S}_2$ (80) as well as an addition $\vec{S}_1+\vec{S}_2$ (81) to be carrie out in the adjustment unit (7) to achieve the desired phase shift of 90 °=π/2. The addition unit (81) and subtraction unit (80) have amplitude adjustment steps by means of amplifiers Verst. 3 (86), or Verst. 4 (88) and a reference voltage adjustment Ref. 3 (87) or Ref. 4 (89) as described for the differential amplifiers (11). When the particular amplitudes and references have been adjusted by subtraction (80) and addition (81) in accordance with the intersections with the Ref 0 (95) accurate interpolation (AD conversion) (90) can take place and be supplied to the client control (5) via measured value processing together with total absolute value formation and data transfer (93) of the angle and linear measured value via the binary output (101).

The inverting (83) of—($\vec{S}_1-\vec{S}_2$) shown in FIG. 8 performs useful interpolation (AD conversion) (90) using the 3-vector process described more fully in patent application 10160835.7. The segment sensor unit (10) for recording absolute encoded segments by means of sin/cos or A/B signals (43) and amplifier switch (12) with variable hysteresis (75) was also adopted in order to clarify the method and procedure for creating the total absolute value from a fine absolute value (77) by means of interpolators (AD converters) (90) and from the A/B segment signal (76) in the measured value processor together with data transfer (93) to the binary output 101.

The method and procedure for adjustment processes as shown in FIG. 8 for determination of amplitudes and reference both at standstill as well as throughout the total range of motion already represent far-reaching measures to compensate for the constraints present in industry with respect to fluctuations in integrated encoder signals, and this allows very accurate angle and linear measurements in real-time to be achieved. In principle, the method can be further expanded for every measuring step by ascertaining the speed of the moving device and taking into account the time taken for one segment to be measured.

$$V_{actual}=s/t \rightarrow S_{set}=V_{actual}*t_{measured}$$

$$S_{actual}=\text{measured path }=S_2-S_1$$

$$T_{measured}=\text{time for path travelled } S_{actual},$$

i.e. from $S_1$ to $S_2$ $$\Delta s=S_{actual}-S_{set}$$

$$\Delta s=(S_2-S_1)-V_{actual}*t_{measured}$$

When applied to incremental values good approximation gives |Δs|≈k= const, so that fluctuation from that can be compensated at any time via amplitude amplification for signal vectors $\vec{S}_1$ (71) as well as $\vec{S}_2$ (73) or $\vec{S}_1-\vec{S}_2$ (86) as well as $\vec{S}_1+\vec{S}_2$ (88). In principal, this method may be expanded at will using arithmetic algorithms without causing any change to the basic relationship of angle and linear compensation by influencing the amplitudes. These procedures provide an elegant way of compensating given distortions of less than ideal sinusoidal values over the period length and thus significantly increase the absolute accuracy of angle and linear measuring systems.

In FIG. 10 the information in the block diagram of the digital signal processing (97) for determining speed and linear measurement (112, 113) is represented as a component of the adjustment unit (7).

After interpolation (AD conversion) (90) the fine values within a partial path (scale division or period length 360°=2

$\pi$ are calculated as a resolved linear segment in, for example, 8 Bit resolution steps via the output (77) of the digital signal processing (97). This together with, for example, a constant time value of t=1/f of a clock frequency f (111) from an oscillator (110), which is present for the digital logic anyway, gives the speed of the measured moving device as $V_{actual}$=s/t. From the measured path $S_{actual}$ and the calculated path $S_{set}$ the error fluctuation is calculated as $\Delta s = S_{actual} - S_{set}$ (112) and supplied to a comparison unit $\Delta s <> const.$ (113). The absolute path s (77) is also supplied to the comparison unit which, logically from the size of the measured value within the period length of $2\pi$, influences the amplifier inputs accordingly in FIG. 8 for Verst 1 or Verst 2 or Verst 3 or Verst 4 of vectors $\vec{S}_1$ or $\vec{S}_2$ or $\vec{S}_1-\vec{S}_2$ or $\vec{S}_1+\vec{S}_2$.

The mixed signal technology layout shown in FIG. 8 has the advantage that the adjustment unit (7) and even all of the electronics (8) together with the sensor arrangement (2) can be placed on an ASIC with established hardware functions for a mounted/integrated encoder (200) e.g. in Hall sensor technology without the requirement of a separate micro-controller/processor. This allows the particular compact designs (200) required for integrated encoders.

FIG. 9 shows the same information in principle as FIG. 8, but with mainly digital rather than analog processing of the vector values $\vec{S}_1$ or $\vec{S}_1-\vec{S}_2$ or $\vec{S}_2$ or $\vec{S}_1+\vec{S}_2$. Signal processing in the adjustment unit (7) in FIG. 9 is identical to FIG. 8 as far as the analog signal output of vectors $\vec{S}_1$ or $\vec{S}_2$ created by the sensor units (2) via differential amplifiers. Immediately after that the analog signal values $\vec{S}_1$ and $\vec{S}_2$ are digitalized via interpolators or AD converters (96). This allows the digital values to undergo the same procedures as in FIG. 8 according to the four basic arithmetical functions (addition, subtraction, multiplication, division). The method for creating vector values $\vec{S}_1-\vec{S}_2$ (84) or $\vec{S}_1+\vec{S}_2$ (85), when the phase shift between $\vec{S}_1$ and $\vec{S}_2$ is not $90° = \pi/2$, determination of the amplitude and reference and calculating the speed is the same as in FIG. 8, whereby the operations are carried out purely digitally. Digital signal processing (92) is therefore somewhat more extensive than in FIG. 8 (97). Creation of the fine absolute value (77) is now also carried out purely digitally during absolute value determination (94) along purely arithmetical lines via arc tan $\phi$, instead of in the analog interpolator unit (AD converter) (90) in FIG. 8. Measured value processing together with total absolute value determination with data transfer (93) and binary output/binary input (100) is the same as in FIG. 8.

It is appropriate to equip the design described in FIG. 9 with a micro-controller/processor in order to carry out the above-mentioned arithmetical steps. This solution is of particular benefit if it is already required for additional functions in the encoder (200), (for example flexible parameterization during operation) and the AD converters (96) or interpolators are small and cost-effective enough to be included in the encoder electronics (8).

The partial segment sensor unit (110) with sin/cos or A/B output (43) described in FIG. 8 and including the amplifier switch (12) for A/B partial segment value (76) is also the same for total absolute value creation. This also shows that the various embodiments of the adjustment unit (7) with more or less digital signal processing are based on the same method of signal processing according to the invention and will also give the same results.

I claim:

1. A measuring device comprising:

a measured value processor;

a sensor arrangement for recording values, said sensor arrangement producing at least two signals phase-shifted to one another as a continuous function, said signals being supplied to said measured value processor;

an adjustment unit being connected in series to said sensor arrangement, said adjustment unit adjusting amplitudes of said phase-shifted signals to one another and/or producing from said phase-shifted signals signals out of phase by about 90°, said produced signals being then evaluated and outputted for further processing.

2. The measuring device according to claim 1, wherein adjustment takes place at the times when said phase-shifted signals intersect a common reference.

3. The measuring device according to claim 1, wherein said phase-shifted signals have sinusoidal values.

4. The measuring device according to claim 1, wherein for any phase-shifted values the 90° phase-shift results from addition or subtraction of the values.

5. The measuring device according to claim 2, wherein said common reference is created by producing an average value of at least two values phase-shifted by 90°.

6. The measuring device according to claim 2, wherein said common reference is firmly set.

7. The measuring device according to claim 1, wherein for non-symmetrical, calculated amplitudes of particular values, a reference thereof is suitably adjusted in said adjustment unit.

8. The measuring device according to claim 1, wherein non-symmetrical, calculated distances of intersections of particular values with a common reference are calculated by taking into account an adjustment speed thereof and a particular reference thereof is correspondingly adjusted in said adjustment unit.

9. The measuring device according to claim 1, further comprising an interpolator, values resolved by said interpolator being calculated by taking into account their adjustment speed and, if they fluctuate from one another, their amplitudes being adjusted accordingly.

10. The measuring device according to claim 1, wherein distances of sensors from one another are chosen independently of a scale division.

11. The measuring device according to claim 1, wherein the same measuring device is used for varying scale divisions.

12. The measuring device according to claim 1, wherein two values phase-shifted by 90° and an additional value phase-shifted by 180° are created from said phase-shifted signals and used for evaluation.

13. The measuring device according to claim 1, wherein said adjustment unit is located on an ASIC equipped with fixed hardware functions for an integrated or mounted encoder.

14. The measuring device according to claim 1, wherein said sensor arrangement is for recording angles and linear values.

15. The measuring device according to claim 1, wherein a whole electronics unit including said sensor arrangement is located on an ASIC equipped with fixed hardware functions for an integrated or mounted encoder.

* * * * *